(12) United States Patent
Cocagne

(10) Patent No.: US 10,855,769 B2
(45) Date of Patent: *Dec. 1, 2020

(54) PRIORITIZING MEMORY DEVICES TO REPLACE BASED ON NAMESPACE HEALTH

(71) Applicant: International Business Machines Corporation, Armonk, NY (US)

(72) Inventor: Thomas D. Cocagne, Elk Grove Village, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,363

(22) Filed: May 20, 2019

(65) Prior Publication Data
US 2019/0281114 A1 Sep. 12, 2019

Related U.S. Application Data

(63) Continuation of application No. 15/840,508, filed on Dec. 13, 2017, now Pat. No. 10,389,814, which is a (Continued)

(51) Int. Cl.
*H04L 29/08* (2006.01)
*G06F 11/10* (2006.01)

(52) U.S. Cl.
CPC ...... *H04L 67/1097* (2013.01); *G06F 11/1076* (2013.01); *G06F 11/1092* (2013.01); *G06F 2211/1028* (2013.01)

(58) Field of Classification Search
CPC .................................................. G04L 67/1097
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Fritz Alphonse
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device detects memory error(s) associated with a plurality of sets of memory devices of sets of storage unit(s) (SU(s)) within the DSN that distributedly store a set of encoded data slices (EDSs). The computing device facilitates detection of EDS error(s) associated with the memory error(s). For a set of memory devices, the computing device establishes a corresponding memory replacement priority level and facilitates replacement of corresponding memory device(s) associated with the EDS error(s) based on the corresponding memory replacement priority level.

20 Claims, 7 Drawing Sheets

Related U.S. Application Data continuation-in-part of application No. 15/839,814, filed on Dec. 12, 2017, now Pat. No. 10,051,057, which is a continuation-in-part of application No. 15/673,978, filed on Aug. 10, 2017, now Pat. No. 10,015,255, which is a continuation of application No. 14/876,154, filed on Oct. 6, 2015, now Pat. No. 9,774,684, and a continuation-in-part of application No. 14/792,577, filed on Jul. 6, 2015, now Pat. No. 9,354,974, which is a continuation of application No. 13/863,475, filed on Apr. 16, 2013, now Pat. No. 9,092,140, which is a continuation of application No. 12/797,025, filed on Jun. 9, 2010, now Pat. No. 8,595,435, said application No. 13/863,475 is a continuation-in-part of application No. 12/080,042, filed on Mar. 31, 2008, now Pat. No. 8,880,799, which is a continuation-in-part of application No. 11/973,542, filed on Oct. 9, 2007, now Pat. No. 9,996,413, and a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937.

(60) Provisional application No. 62/086,611, filed on Dec. 2, 2014, provisional application No. 61/230,038, filed on Jul. 30, 2009.

(58) Field of Classification Search
USPC .......................................... 714/764, 768, 767
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,346,751 B2 | 3/2008 | Prahlad et al. | |
| 7,469,325 B2 | 12/2008 | Shibayama et al. | |
| 7,636,724 B2 | 12/2009 | de la Torre et al. | |
| 8,621,271 B2 | 12/2013 | Grube et al. | |
| 8,726,127 B2 | 5/2014 | Grube et al. | |
| 8,756,480 B2 | 6/2014 | Gladwin et al. | |
| 8,788,878 B2 | 7/2014 | Kaushik et al. | |
| 8,924,770 B2 | 12/2014 | Gladwin et al. | |
| 8,954,787 B2 | 2/2015 | Gladwin et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2018/0115604 A1* | 4/2018 | Cocagne | G06F 11/1092 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

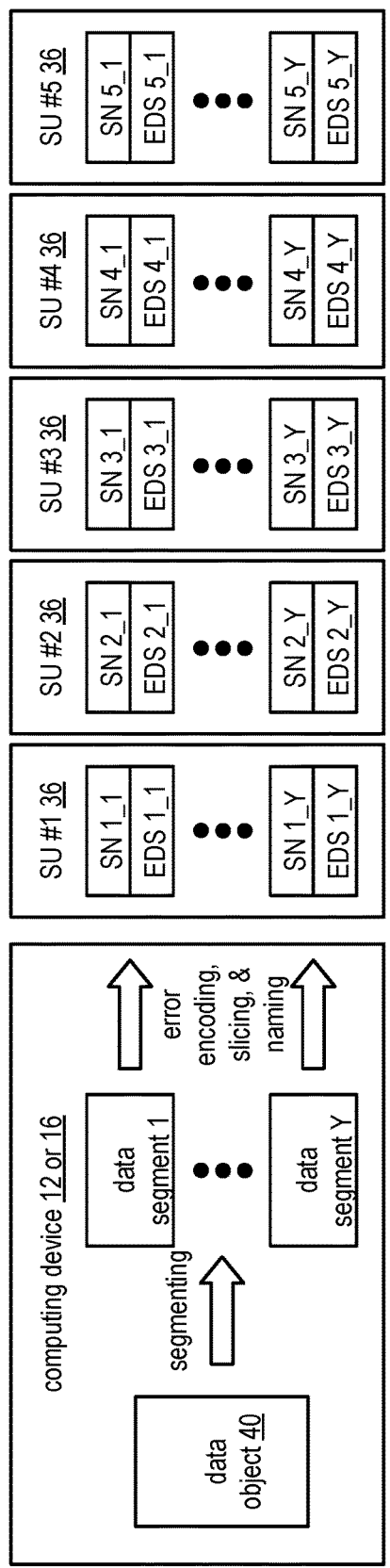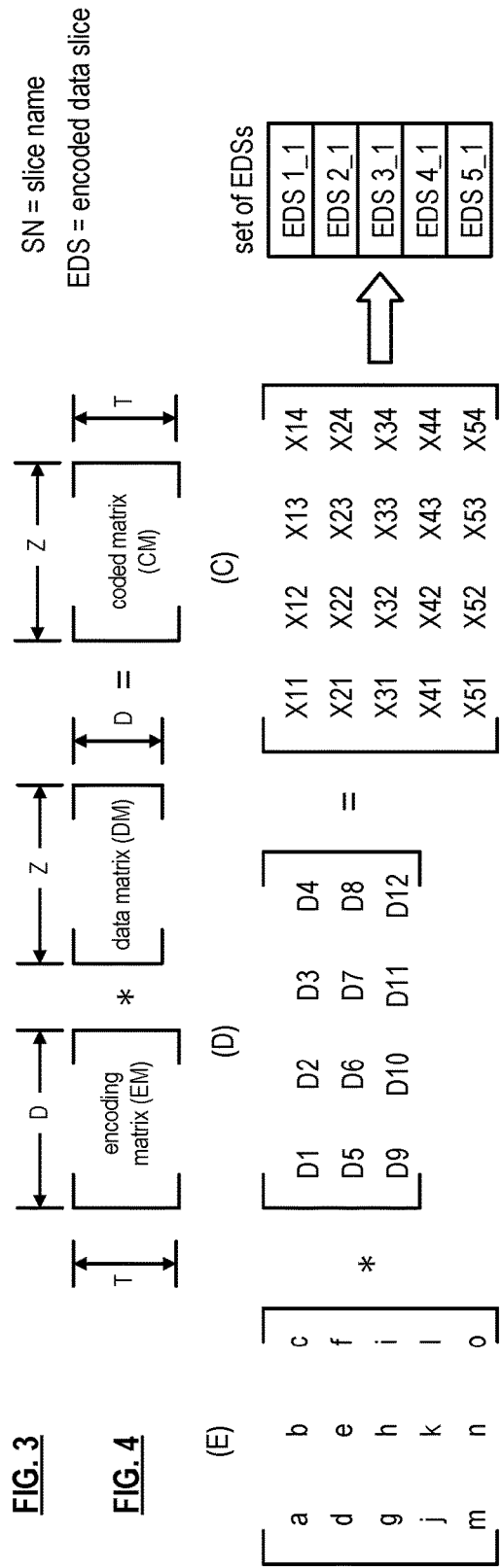

PRIORITIZING MEMORY DEVICES TO REPLACE BASED ON NAMESPACE HEALTH

CROSS REFERENCE TO RELATED PATENTS

The present U.S. Utility Patent Application claims priority pursuant to 35 U.S.C. § 120 as a continuation of U.S. Utility patent application Ser. No. 15/840,508, entitled "PRIORITIZING MEMORY DEVICES TO REPLACE BASED ON NAMESPACE HEALTH," filed Dec. 13, 2017, which is a continuation-in-part (CIP) of U.S. Utility patent application Ser. No. 15/839,814, entitled "PRIORITIZING READ LOCATIONS BASED ON AN ERROR HISTORY," filed Dec. 12, 2017, issued as U.S. Pat. No. 10,051,057 on Aug. 14, 2018, which claims priority pursuant to 35 U.S.C. § 120 as a continuation-in-part (CIP), of U.S. Utility patent application Ser. No. 15/673,978, entitled "STORING DATA IN A DISPERSED STORAGE NETWORK," filed Aug. 10, 2017, issued as U.S. Pat. No. 10,015,255 on Jul. 3, 2018, which claims priority pursuant to 35 U.S.C. § 120 as a continuation of U.S. Utility application Ser. No. 14/876,154, entitled "STORING DATA IN A DISPERSED STORAGE NETWORK," filed Oct. 6, 2015, issued as U.S. Pat. No. 9,774,684 on Sep. 26, 2017, which claims priority pursuant to 35 U.S.C. § 119(e) to U.S. Provisional Application No. 62/086,611, entitled "MAINTAINING DATA INTEGRITY IN A DISPERSED STORAGE NETWORK" filed Dec. 2, 2014, all of which are hereby incorporated herein by reference in their entirety and made part of the present U.S. Utility Patent Application for all purposes.

U.S. Utility application Ser. No. 14/876,154 also claims priority pursuant to 35 U.S.C. § 120 as a continuation-in-part (CIP) of U.S. Utility application Ser. No. 14/792,577, entitled "DISPERSED STORAGE WRITE PROCESS," filed Jul. 6, 2015, issued as U.S. Pat. No. 9,354,974 on May 31, 2016, which is a continuation of U.S. Utility application Ser. No. 13/863,475, entitled "DISPERSED STORAGE WRITE PROCESS," filed Apr. 16, 2013, issued as U.S. Pat. No. 9,092,140 on Jul. 28, 2015, which is a continuation of U.S. Utility application Ser. No. 12/797,025, entitled "DISPERSED STORAGE WRITE PROCESS," filed Jun. 9, 2010, issued as U.S. Pat. No. 8,595,435 on Nov. 26, 2013, which claims priority pursuant to 35 U.S.C. § 119(e) to U.S. Provisional Application No. 61/230,038, entitled "DISPERSED STORAGE NETWORK VERSION SYNCHRONIZATION," filed Jul. 30, 2009, all of which are hereby incorporated herein by reference in their entirety and made part of the present U.S. Utility Patent Application for all purposes.

U.S. Utility application Ser. No. 13/863,475 also claims priority pursuant to 35 U.S.C. § 120 as a continuation-in-part (CIP) patent application of U.S. Utility application Ser. No. 12/080,042, entitled, "REBUILDING DATA ON A DISPERSED STORAGE NETWORK," filed Mar. 31, 2008, issued as U.S. Pat. No. 8,880,799 on Nov. 4, 2014, which is a continuation-in-part (CIP) of U.S. Utility application Ser. No. 11/973,542, entitled "ENSURING DATA INTEGRITY ON A DISPERSED STORAGE GRID," filed Oct. 9, 2007, issued as U.S. Pat. No. 9,996,413 on Jun. 12, 2018, and is a continuation-in-part (CIP) of U.S. Utility application Ser. No. 11/403,391, entitled "SYSTEM FOR REBUILDING DISPERSED DATA," filed Apr. 13, 2006, issued as U.S. Pat. No. 7,546,427 on Jun. 6, 2009, which is a continuation-in-part (CIP) of U.S. Utility application Ser. No. 11/241,555, entitled "SYSTEMS, METHODS, AND APPARATUS FOR SUBDIVIDING DATA FOR STORAGE IN A DISPERSED DATA STORAGE GRID," filed Sep. 30, 2005, issued as U.S. Pat. No. 7,953,937 on May 31, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within prior art data storage systems, storage errors may occur for various reasons. The prior art does not provide adequate means by which such storage errors may be appropriately identified, processed, corrected, and/or managed. Moreover, the prior art does not provide adequate means to operate regarding failed memory devices therein and how their failures adversely affect the overall operation of the system art data storage system. The prior art is in need of improvement in the manner by which such data storage systems operate including dealing with failed memory devices therein.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
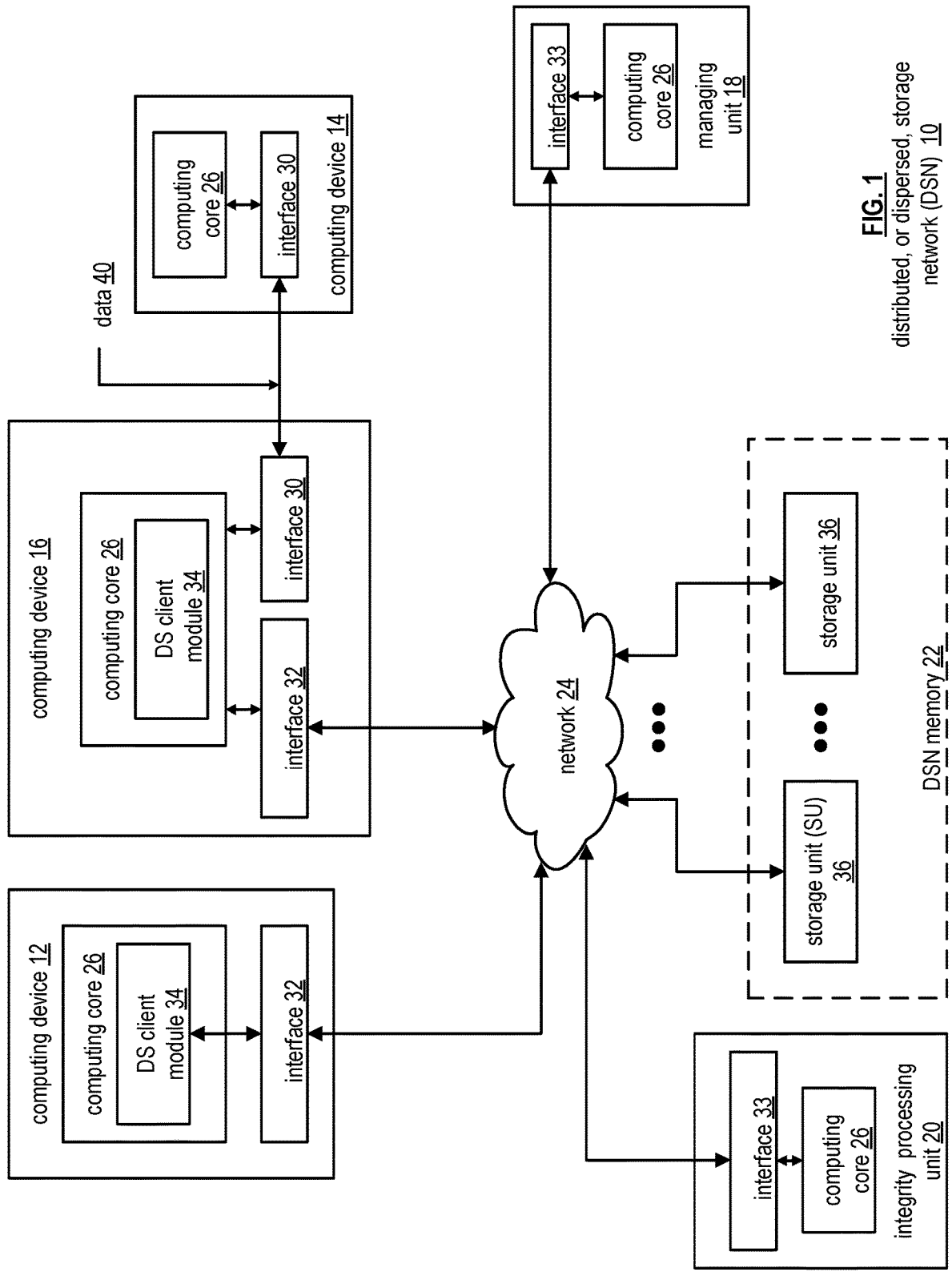
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
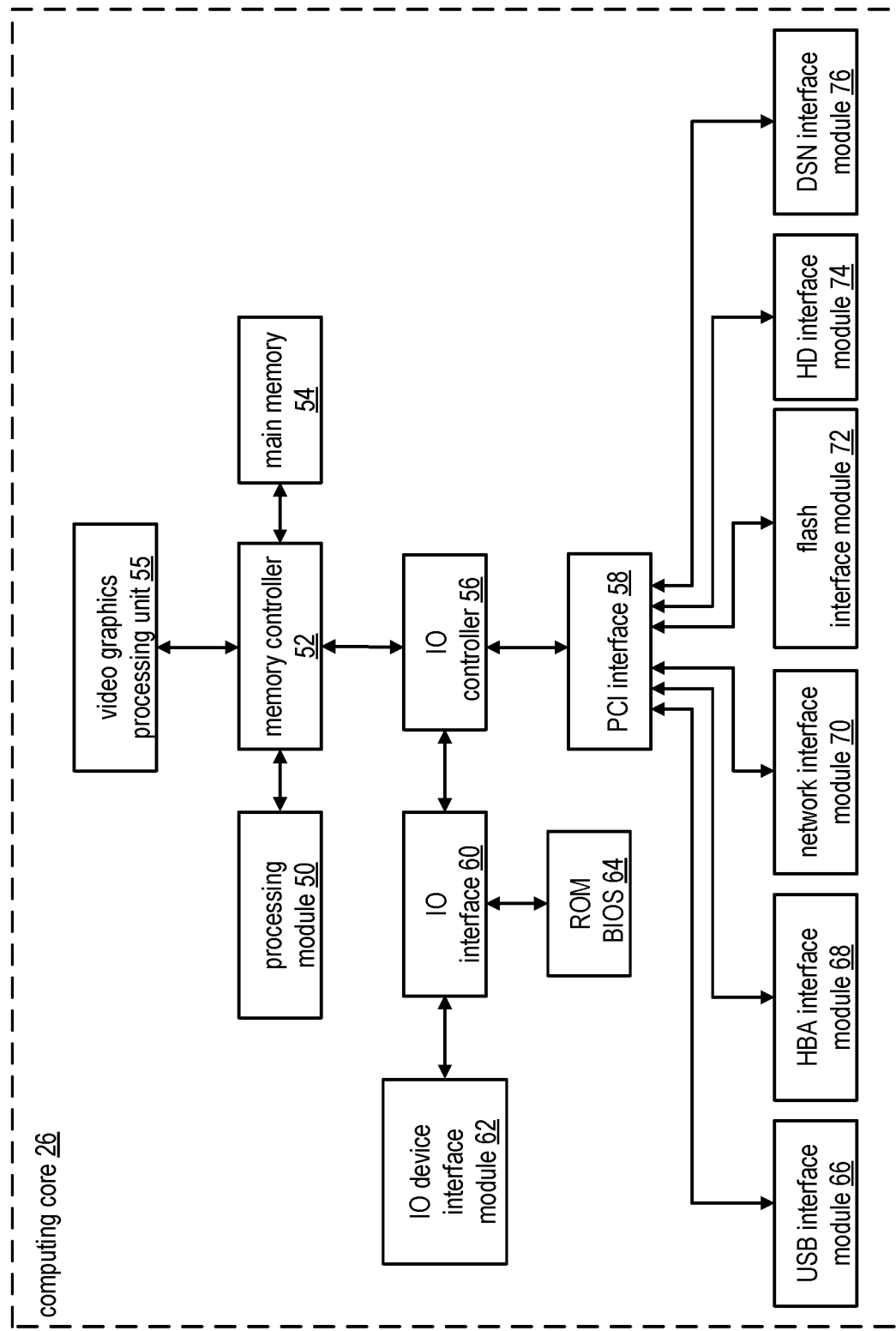
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
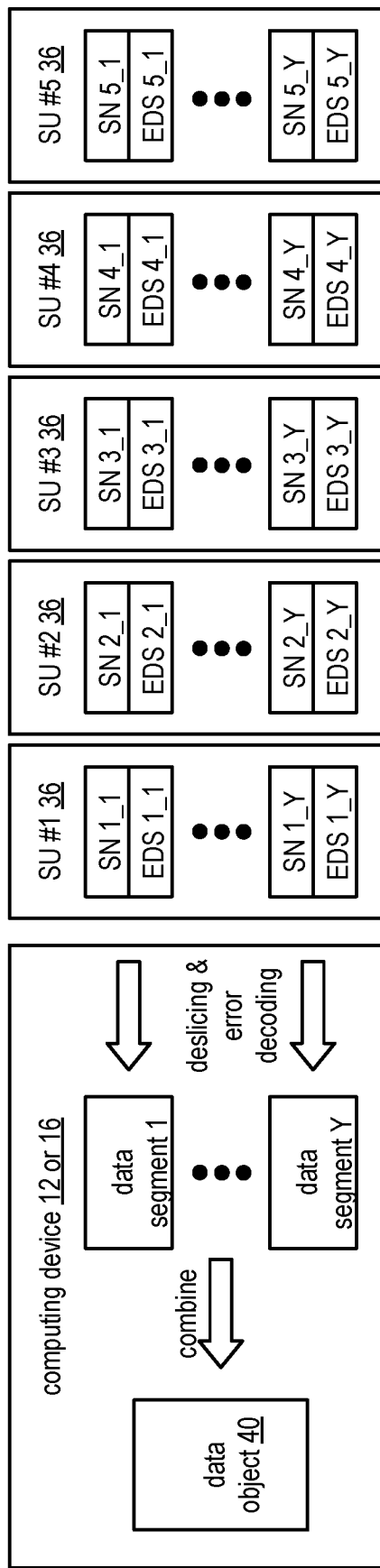
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
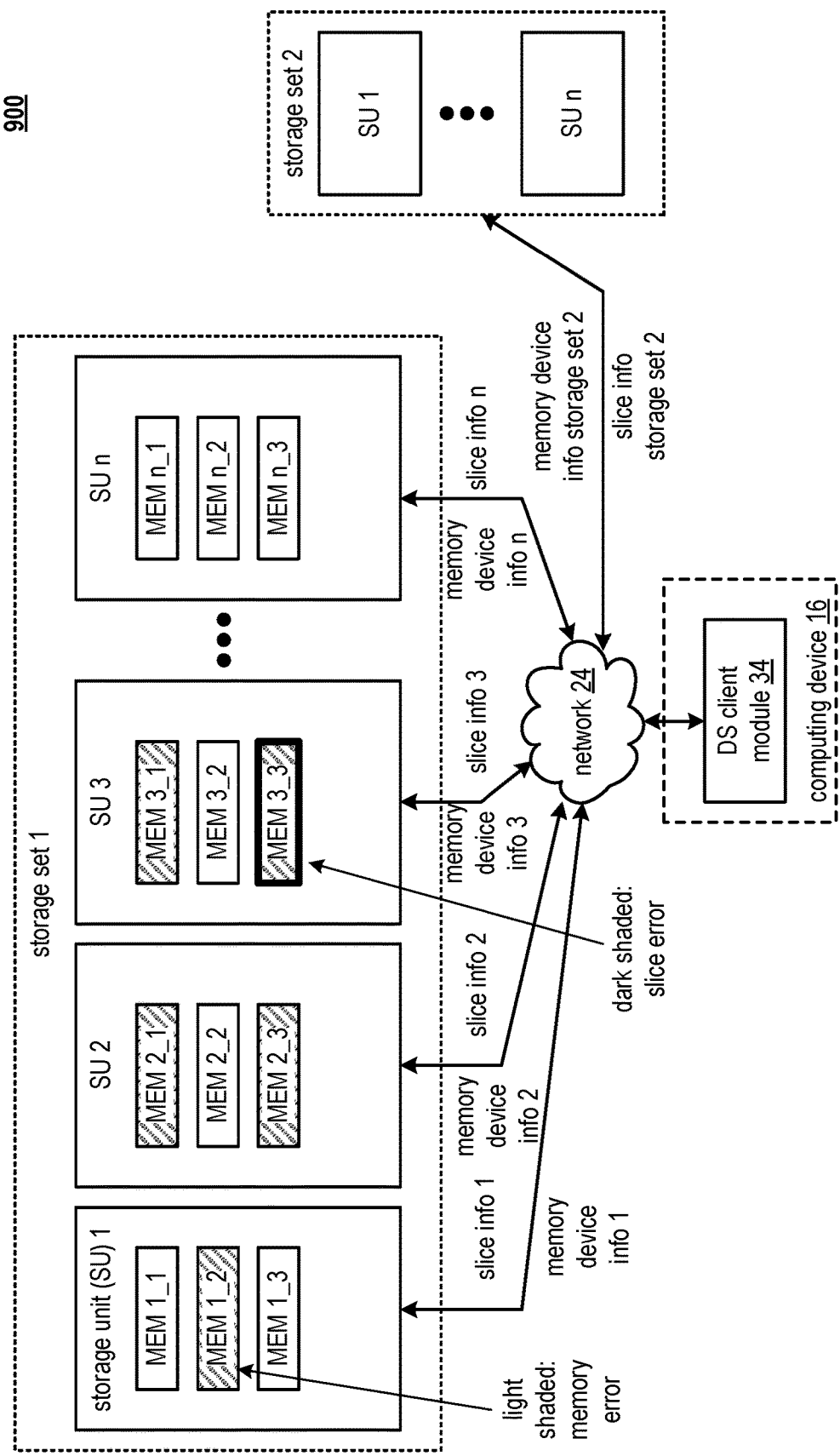
FIG. 9 is a schematic block diagram of an embodiment of a dispersed or distributed storage network (DSN) in accordance with the present invention.

FIG. 9 is a schematic block diagram of an embodiment of a dispersed or distributed storage network (DSN) in accordance with the present invention. This diagram includes a schematic block diagram of another embodiment of a dispersed storage network that includes one or more storage sets 1-2, the network 24 of FIG. 1, and the distributed storage (DS) client module 34 of FIG. 1 and/or computing device 16 of FIG. 1. Note that such operations, functions, etc. as described herein as being performed by such a DS client module 34 may alternatively be performed by computing device 16. Each storage set includes a set of storage units (SUs) 1-$n$. Each SU includes a plurality of memory devices, where each memory device is associated with a set of memory devices of the set of SUs. Each set of memory devices is associated with a unique dispersed storage network (DSN) address range corresponding (e.g., common for each memory device of the set of memory devices). For example, each SU includes a first memory device that is associated with a first common DSN address range, a second memory device that is associated with a second common DSN address range, and a third memory device that is associated with a third common DSN address range. Each SU may be implemented utilizing the SU 36 of FIG. 1. The DSN functions to prioritize replacement of failed memory devices, where the one or more storage sets mirror stored data when at least two storage sets are utilized.

In an example of operation of the prioritizing of the replacement of the failed memory devices, the DS client module 34 detects one or more memory errors associated with memory devices of two or more sets of memory devices. The detecting includes at least one of receiving an error message, issuing a query, and interpreting a query response. For example, the DS client module 34 receives memory device information from at least some of the SUs indicating that memory errors are associated with memories 1_2, 2_1, 2_3, and 3_1.

Having detected the one or more memory errors, the DS client module 34 facilitates slice error detection for stored data associated with each of the two or more sets of memory devices based on slice information from at least some of the SUs. For example, the DS processing module 34 issues, via the network 24, list slice requests to the SUs, receives list slice responses, and identifies slice errors based on comparing the list slice responses. For instance, the DS client module 34 detects a slice error associated with at least one encoded data slice corresponding to memory 3_3 of a third set of memory devices.

For each set of memory devices, the DS client module 34 establishes a memory replacement priority level for memory devices of the set of memory devices associated with the memory errors based on a number of memory errors of the set of memory devices and a number of detected slice errors for the store data associated with the set of memory devices. For example, the DS client module 34 establishes a highest memory replacement priority level for memory devices 2_1 and 3_1 (e.g., two memory errors), establishes a second highest memory replacement priority for memory device 2_3 (e.g., one memory error and one slice error), and establishes a third-highest memory replacement priority for memory device 1_2 (e.g., one memory error).

Having established the memory replacement priority levels, the DS client module 34 facilitates replacement of the memory devices of the two or more sets of memory devices associated with the one or more detected memory errors in accordance with the associated memory replacement priority level for each set of memory devices. The facilitating includes at least one of indicating the memory devices for replacement and the associated memory replacement priority level, and activating a dormant memory device as a replacement for a film memory device in accordance with the memory replacement priority level.

In an example of operation and implementation, a computing device includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16 such as with respect to FIG. 1, FIG. 9, and/or any other diagram, example, embodiment, etc. as presented herein) is configured to detect one or more memory errors associated with a plurality of sets of memory devices of one or more sets of storage units (SUs) within the DSN that distributedly store a set of encoded data slices (EDSs), wherein a data object is segmented into a plurality of data segments. Note that a data segment of the plurality of data segments is dispersed error encoded in accordance with dispersed error encoding parameters to produce the set of encoded data slices (EDSs). The computing device is also configured to facilitate detection of one or more EDS errors associated with the one or more memory errors associated with the plurality of sets of memory devices of the one or more sets of SUs within the DSN.

Then, for each corresponding set of the plurality of sets of memory devices of the one or more sets of SUs within the DSN, the computing device is also configured to establish a corresponding memory replacement priority level for at least one corresponding memory device of a corresponding set of the plurality of sets of memory devices that is associated with the one or more EDS errors. Also, the computing device is configured to facilitate replacement of the at least one corresponding memory device of the corresponding set of the plurality of sets of memory devices that is associated with the one or more EDS errors based on the corresponding memory replacement priority level.

In some examples, for a first corresponding set of the plurality of sets of memory devices of the one or more sets of SUs within the DSN, the computing device is also configured to establish a first memory replacement priority level for a first at least one corresponding memory device of the first corresponding set of the plurality of sets of memory devices that is associated with a first one or more EDS errors facilitate replacement of the first at least one corresponding memory device of the first corresponding set of the plurality of sets of memory devices that is associated with the first one or more EDS errors based on the first corresponding memory replacement priority level.

Also, in certain other examples, for a second corresponding set of the plurality of sets of memory devices of the one or more sets of SUs within the DSN, the computing device is also configured to establish a second memory replacement priority level for a second at least one corresponding memory device of the second corresponding set of the plurality of sets of memory devices that is associated with a second one or more EDS errors and facilitate replacement of the second at least one corresponding memory device of the second corresponding set of the plurality of sets of memory devices that is associated with the second one or more EDS errors based on the second corresponding memory replacement priority level.

Also, in some other examples, the computing device is also configured to facilitate the detection of one or more EDS errors associated with the one or more memory errors associated with the plurality of sets of memory devices of the one or more sets of SUs within the DSN based on receiving an error message, issuing a query, and/or interpreting a query response.

In addition, in certain other examples, the computing device is also configured to facilitate the replacement of the at least one corresponding memory device of the corresponding set of the plurality of sets of memory devices that is associated with the one or more EDS errors based on the corresponding memory replacement priority level based on indicating the at least one corresponding memory device for replacement and the corresponding memory replacement priority level, and/or activating a dormant memory device as a replacement for a film memory device based on the corresponding memory replacement priority level.

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

Figure 10:
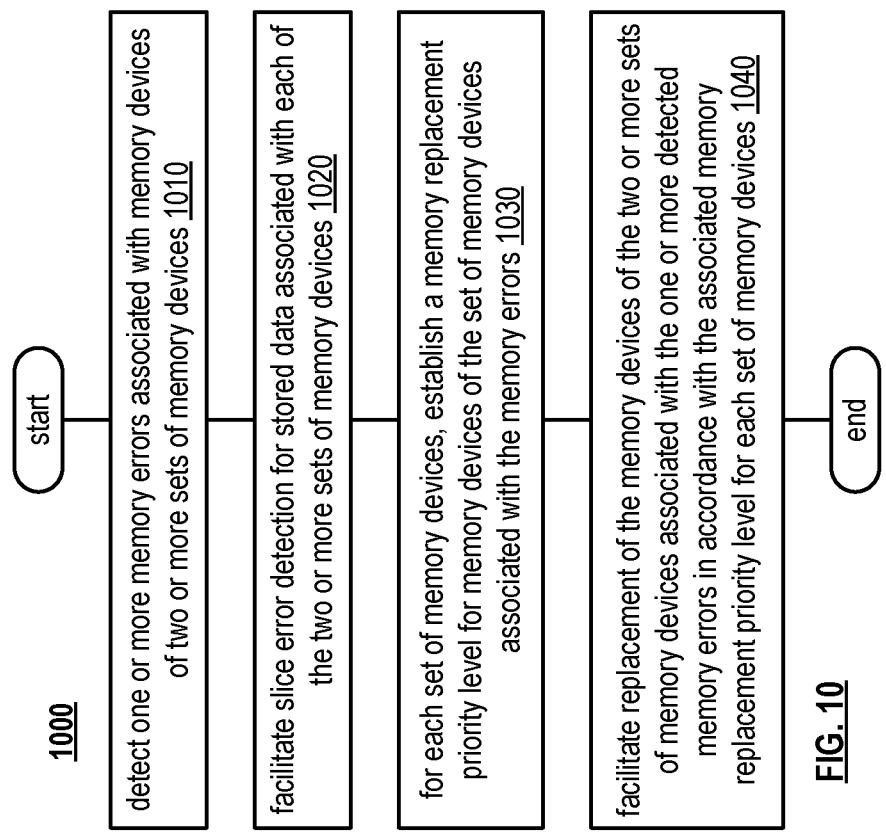
FIG. 10 is a flowchart illustrating an example of prioritizing replacement of failed memory devices in accordance with the present invention.

FIG. 10 is a flowchart illustrating an example of prioritizing replacement of failed memory devices in accordance with the present invention. This diagram includes a flowchart illustrating an example of prioritizing replacement of failed memory devices. The method 1000 begins or continues at a step 1010 where a processing module (e.g., of a distributed storage (DS) client module and/or computing device) detects one or more memory errors associated with memory devices of two or more sets of memory devices. The detecting includes at least one of interpreting an error message, initiating a query, and interpreting a query response.

The method 1000 continues at the step 1020 where the processing module facilitates slice error detection for stored data associated with each of the two or more sets of memory devices. For example, the processing module issues list slice requests or read slice requests, receives list slice responses or read slice responses, and identifies slice errors based on the received responses.

For each set of memory devices, the method 1000 continues at the step 1030 where the processing module establishes a memory replacement priority level for memory devices of the set of memory devices associated with the memory errors. For example, the processing module establishes the memory replacement priority level based on a total number of errors including a number of memory errors and a number of detected slice errors. For instance, the processing module establishes a higher priority for a higher total number of errors. As another instance, the processing module establishes a lower priority for a lower total number of errors. As yet another instance, the processing module weights memory errors more than slice errors of the total number of errors.

The method 1000 continues at the step 1040 where the processing module facilitates replacement of the memory devices of the two or more sets of memory devices associated with the one or more detected memory errors in accordance with the associated memory replacement priority level for each set of memory devices. For example, the processing module indicates the memory devices for replacement and the associated memory replacement priority level. As another example, the processing module activates a dormant memory device as a replacement for a failed memory device in accordance with the memory replacement priority level.

Figure 11:
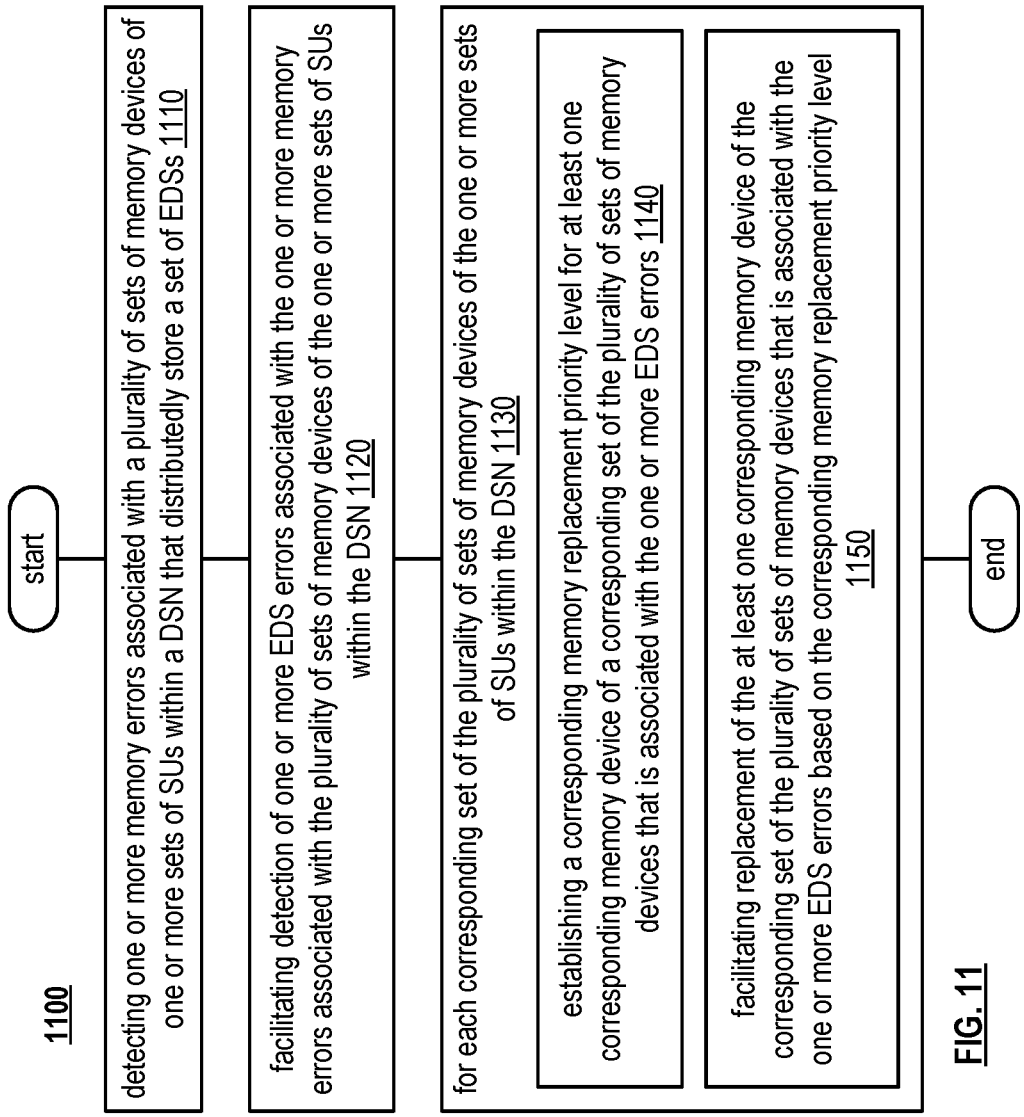
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention.

The method 1100 operates in step 1110 by detecting one or more memory errors associated with a plurality of sets of memory devices of one or more sets of storage units (SUs) within a dispersed or distributed storage network (DSN) that distributedly store a set of encoded data slices (EDSs). Note that a data object is segmented into a plurality of data segments, and a data segment of the plurality of data segments is dispersed error encoded in accordance with dispersed error encoding parameters to produce the set of encoded data slices (EDSs).

The method 1100 then continues in step 1120 by facilitating (e.g., via an interface of the computing device that is configured to interface and communicate with the DSN) detection of one or more EDS errors associated with the one or more memory errors associated with the plurality of sets of memory devices of the one or more sets of SUs within the DSN.

For each corresponding set of the plurality of sets of memory devices of the one or more sets of SUs within the DSN (block 1130), the method 1100 operates in step 1140 by establishing a corresponding memory replacement priority level for at least one corresponding memory device of a corresponding set of the plurality of sets of memory devices that is associated with the one or more EDS errors. The method 1100 then continues in step 1150 by facilitating (e.g., via the interface) replacement of the at least one corresponding memory device of the corresponding set of the plurality of sets of memory devices that is associated with the one or more EDS errors based on the corresponding memory replacement priority level.

This disclosure presents, among other things, various novel solutions that operate to prioritize memory devices to replace based on namespace health. For example, when the namespace ranges assigned to memory devices is known, and the failed/recovered state of each memory device is known, then a namespace health map can be generated as follows: initialize entire namespace range from first name to last name with a value equal to the width, and for each memory device (or storage unit (SU)) that has failed but not yet been rebuilt, decrement the value associated with the namespace range for which that memory device (or SU) is responsible for by 1.

This results in a complete picture of how many slices are expected to be available and how many are expected to be missing for any particular name within the namespace, it also enables a list of "least healthy ranges" to be generated which correspond to those overlapping ranges that include the greatest number of unrecovered failures.

In a very large DSN memory, physical replacement of failed memory devices with new memory devices may represent a large task, given the potentially large number of memory devices that fail in any given time period. Since failure to replacement memory devices can serve as an impediment to rebuild operations, and since failure to rebuild meaningfully impacts reliability, it makes sense to prioritize replacement of memory devices that correspond to the least healthy ranges, especially those memory devices responsible for the largest sections of the least healthy ranges. The memory device replacement prioritizer (MIDRP) (e.g., a DS client module 34, a computing device, etc.) uses two pieces of data: a map of namespace ranges owned by failed memory devices, and the least healthy ranges, to produce a prioritized list of memory devices to be replaced. This prioritized list may further be used to assign or allocate resources toward replacement operations.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   processing circuitry operably coupled to the interface and to the memory, wherein the processing circuitry is configured to execute the operational instructions to:
      based on detection of one or more EDS errors associated with one or more memory errors associated with a plurality of sets of memory devices of one or more sets of storage units (SUs) within the DSN that distributedly store a set of encoded data slices (EDSs) and for each corresponding set of the plurality of sets of memory devices of the one or more sets of SUs within the DSN, wherein a data object is segmented into a plurality of data segments, wherein a data segment of the plurality of data segments is dispersed error encoded in accordance with dispersed error encoding parameters to produce the set of EDSs:
         establish a corresponding memory replacement priority level for at least one corresponding memory device of a corresponding set of the plurality of sets of memory devices that is associated with the one or more EDS errors; and
         facilitate replacement of the at least one corresponding memory device of the corresponding set of the plurality of sets of memory devices that is associated with the one or more EDS errors based on the corresponding memory replacement priority level.

2. The computing device of claim 1, wherein the processing circuitry is further configured to execute the operational instructions to:
   detect the one or more memory errors associated with the plurality of sets of memory devices of one or more sets of SUs within the DSN that distributedly store a set of EDSs; and
   facilitate detection of one or more EDS errors associated with the one or more memory errors associated with the plurality of sets of memory devices of the one or more sets of SUs within the DSN.

3. The computing device of claim 1, wherein the processing circuitry is further configured to execute the operational instructions to:
   for a first corresponding set of the plurality of sets of memory devices of the one or more sets of SUs within the DSN:
      establish a first memory replacement priority level for a first at least one corresponding memory device of the first corresponding set of the plurality of sets of memory devices that is associated with a first one or more EDS errors; and
      facilitate replacement of the first at least one corresponding memory device of the first corresponding set of the plurality of sets of memory devices that is associated with the first one or more EDS errors based on the first corresponding memory replacement priority level; and
   for a second corresponding set of the plurality of sets of memory devices of the one or more sets of SUs within the DSN:
      establish a second memory replacement priority level for a second at least one corresponding memory device of the second corresponding set of the plurality of sets of memory devices that is associated with a second one or more EDS errors; and
      facilitate replacement of the second at least one corresponding memory device of the second corresponding set of the plurality of sets of memory devices that is associated with the second one or more EDS errors based on the second corresponding memory replacement priority level.

4. The computing device of claim 3, wherein the processing circuitry is further configured to execute the operational instructions to:

for a third corresponding set of the plurality of sets of memory devices of the one or more sets of SUs within the DSN:
   establish a third memory replacement priority level for a third at least one corresponding memory device of the third corresponding set of the plurality of sets of memory devices that is associated with a third one or more EDS errors; and
   facilitate replacement of the third at least one corresponding memory device of the third corresponding set of the plurality of sets of memory devices that is associated with the third one or more EDS errors based on the third corresponding memory replacement priority level.

5. The computing device of claim 1, wherein the processing circuitry is further configured to execute the operational instructions to:
   facilitate the detection of one or more EDS errors associated with the one or more memory errors associated with the plurality of sets of memory devices of the one or more sets of SUs within the DSN based on at least one of receiving an error message, issuing a query, or interpreting a query response.

6. The computing device of claim 1, wherein the processing circuitry is further configured to execute the operational instructions to:
   facilitate the replacement of the at least one corresponding memory device of the corresponding set of the plurality of sets of memory devices that is associated with the one or more EDS errors based on the corresponding memory replacement priority level based on at least one of indicating the at least one corresponding memory device for replacement and the corresponding memory replacement priority level, or activating a dormant memory device as a replacement for a film memory device based on the corresponding memory replacement priority level.

7. The computing device of claim 1, wherein:
   a decode threshold number of EDSs are needed to recover the data segment;
   a read threshold number of EDSs provides for reconstruction of the data segment;
   a write threshold number of EDSs provides for a successful transfer of the set of EDSs from a first at least one location in the DSN to a second at least one location in the DSN;
   the set of EDSs is of pillar width and includes a pillar number of EDSs;
   each of the decode threshold number, the read threshold number, and the write threshold number is less than the pillar number; and
   the write threshold number is greater than or equal to the read threshold number that is greater than or equal to the decode threshold number.

8. The computing device of claim 1, wherein the computing device is located at a first premises that is remotely located from a second premises of at least one SU of the one or more sets of SUs within the DSN.

9. The computing device of claim 1 further comprising:
   a SU of the one or more sets of SUs within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A method for execution by a computing device, the method comprising:
   based on detection of one or more EDS errors associated with one or more memory errors associated with a plurality of sets of memory devices of one or more sets of storage units (SUs) within a dispersed or distributed storage network (DSN) that distributedly store a set of encoded data slices (EDSs) and for each corresponding set of the plurality of sets of memory devices of the one or more sets of SUs within the DSN, wherein a data object is segmented into a plurality of data segments, wherein a data segment of the plurality of data segments is dispersed error encoded in accordance with dispersed error encoding parameters to produce the set of EDSs:
      establishing a corresponding memory replacement priority level for at least one corresponding memory device of a corresponding set of the plurality of sets of memory devices that is associated with the one or more EDS errors; and
      facilitating, via an interface of the computing device that is configured to interface and communicate with a dispersed or distributed storage network (DSN), replacement of the at least one corresponding memory device of the corresponding set of the plurality of sets of memory devices that is associated with the one or more EDS errors based on the corresponding memory replacement priority level.

12. The method of claim 11 further comprising:
   detecting the one or more memory errors associated with the plurality of sets of memory devices of one or more sets of SUs within the DSN that distributedly store a set of EDSs; and
   facilitating, via the interface, detection of one or more EDS errors associated with the one or more memory errors associated with the plurality of sets of memory devices of the one or more sets of SUs within the DSN.

13. The method of claim 11 further comprising:
   for a first corresponding set of the plurality of sets of memory devices of the one or more sets of SUs within the DSN:
      establishing a first memory replacement priority level for a first at least one corresponding memory device of the first corresponding set of the plurality of sets of memory devices that is associated with a first one or more EDS errors; and
      facilitating, via the interface, replacement of the first at least one corresponding memory device of the first corresponding set of the plurality of sets of memory devices that is associated with the first one or more EDS errors based on the first corresponding memory replacement priority level; and
   for a second corresponding set of the plurality of sets of memory devices of the one or more sets of SUs within the DSN:
      establishing a second memory replacement priority level for a second at least one corresponding memory device of the second corresponding set of the plurality of sets of memory devices that is associated with a second one or more EDS errors; and
      facilitating, via the interface, replacement of the second at least one corresponding memory device of the second corresponding set of the plurality of sets of memory devices that is associated with the second one or more EDS errors based on the second corresponding memory replacement priority level.

14. The method of claim 11 further comprising:

for a third corresponding set of the plurality of sets of memory devices of the one or more sets of SUs within the DSN:

establishing a third memory replacement priority level for a third at least one corresponding memory device of the third corresponding set of the plurality of sets of memory devices that is associated with a third one or more EDS errors; and facilitating, via the interface, replacement of the third at least one corresponding memory device of the third corresponding set of the plurality of sets of memory devices that is associated with the third one or more EDS errors based on the third corresponding memory replacement priority level.

15. The method of claim 11 further comprising:

facilitating the detection of one or more EDS errors associated with the one or more memory errors associated with the plurality of sets of memory devices of the one or more sets of SUs within the DSN based on at least one of receiving an error message, issuing a query, or interpreting a query response.

16. The method of claim 11 further comprising:

facilitating, via the interface, the replacement of the at least one corresponding memory device of the corresponding set of the plurality of sets of memory devices that is associated with the one or more EDS errors based on the corresponding memory replacement priority level based on at least one of indicating the at least one corresponding memory device for replacement and the corresponding memory replacement priority level, or activating a dormant memory device as a replacement for a film memory device based on the corresponding memory replacement priority level.

17. The method of claim 11, wherein:

a decode threshold number of EDSs are needed to recover the data segment;

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

18. The method of claim 11, wherein the computing device is located at a first premises that is remotely located from a second premises of at least one SU of the one or more sets of SUs within the DSN.

19. The method of claim 11, wherein the computing device includes a SU of the one or more sets of SUs within the DSN, a wireless smart phone, a laptop, a tablet, a personal computers (PC), a work station, or a video game device.

20. The method of claim 11, wherein the DSN includes at least one of a wireless communication system, a wire lined communication system, a non-public intranet system, a public internet system, a local area network (LAN), or a wide area network (WAN).

* * * * *